June 24, 1952  R. H. HELSEL  2,601,283
TICKET ISSUING MACHINE
Filed Dec. 13, 1945  12 Sheets-Sheet 1
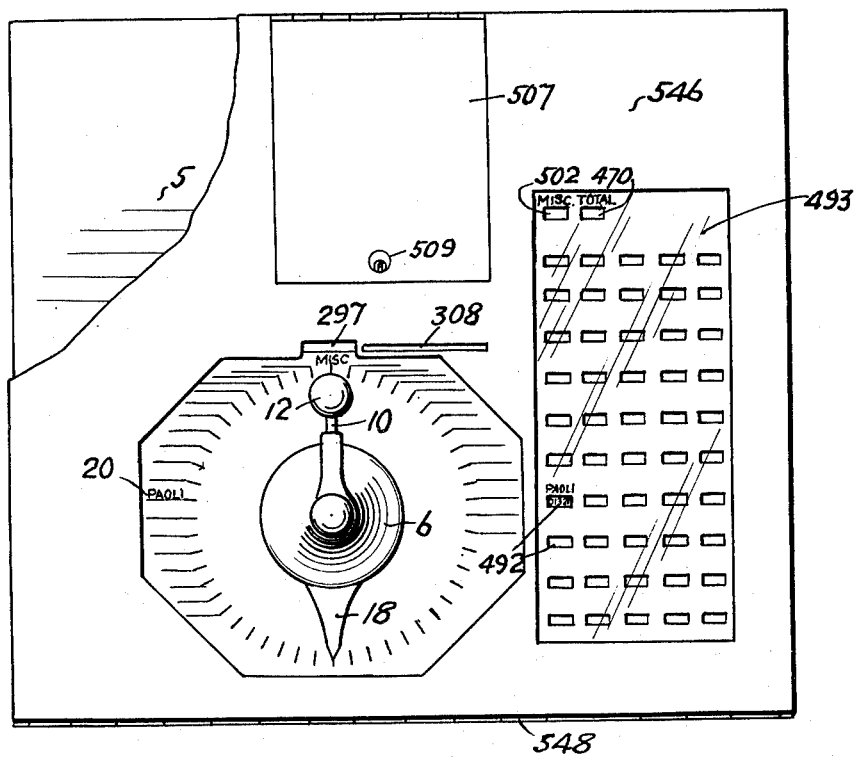
FIG. 1.
FIG. 2.
INVENTOR
Reuben H. Helsel
BY
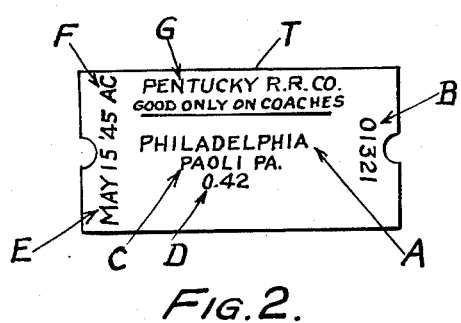
ATTORNEYS.
WITNESS:

INVENTOR
Reuben H. Helsel

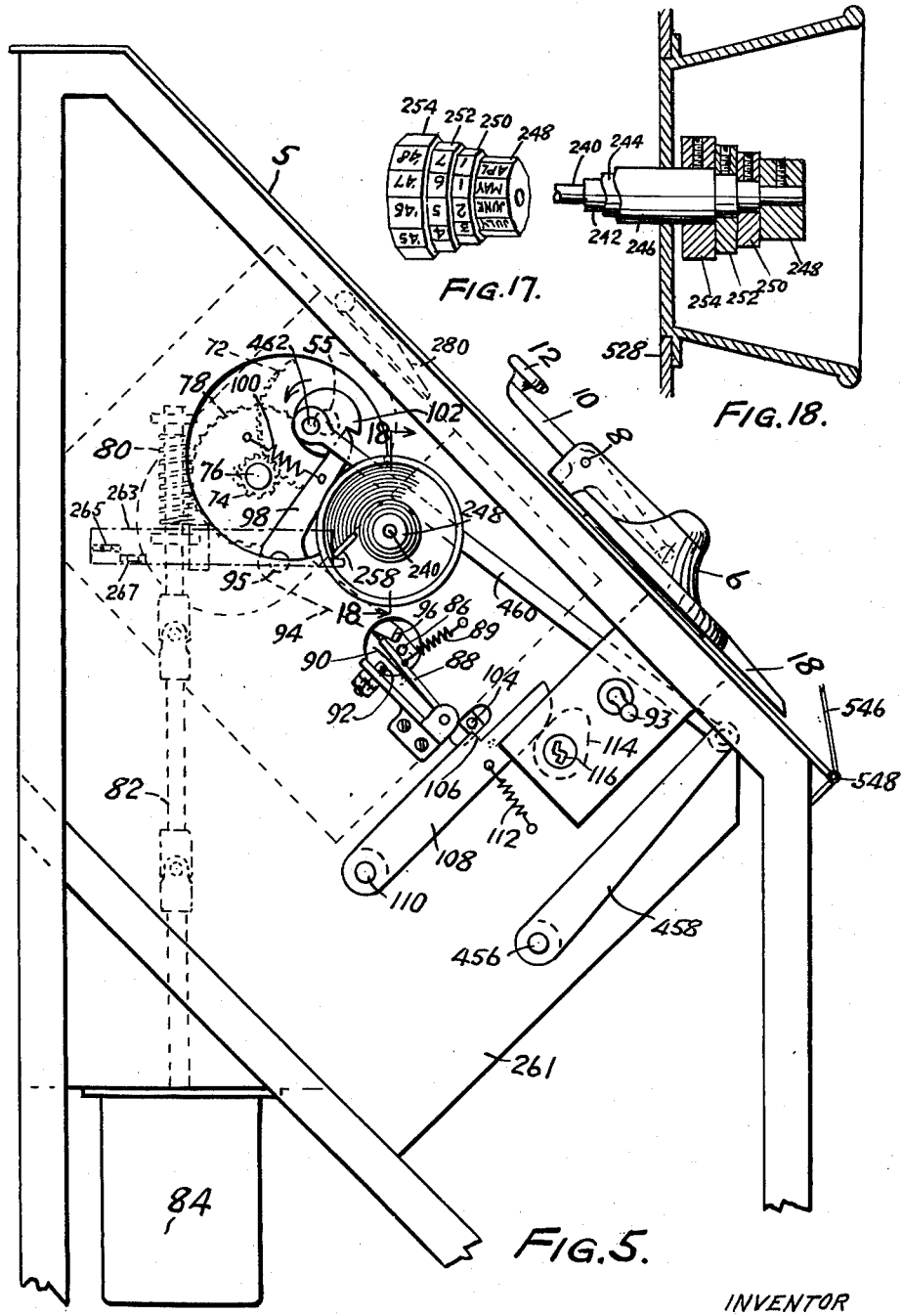

June 24, 1952 R. H. HELSEL 2,601,283
TICKET ISSUING MACHINE
Filed Dec. 13, 1945 12 Sheets-Sheet 5

WITNESS:
Robt P Mitchel

INVENTOR
Reuben H. Helsel
BY
Busser & Harding
ATTORNEYS.

June 24, 1952 R. H. HELSEL 2,601,283
TICKET ISSUING MACHINE
Filed Dec. 13, 1945 12 Sheets-Sheet 6
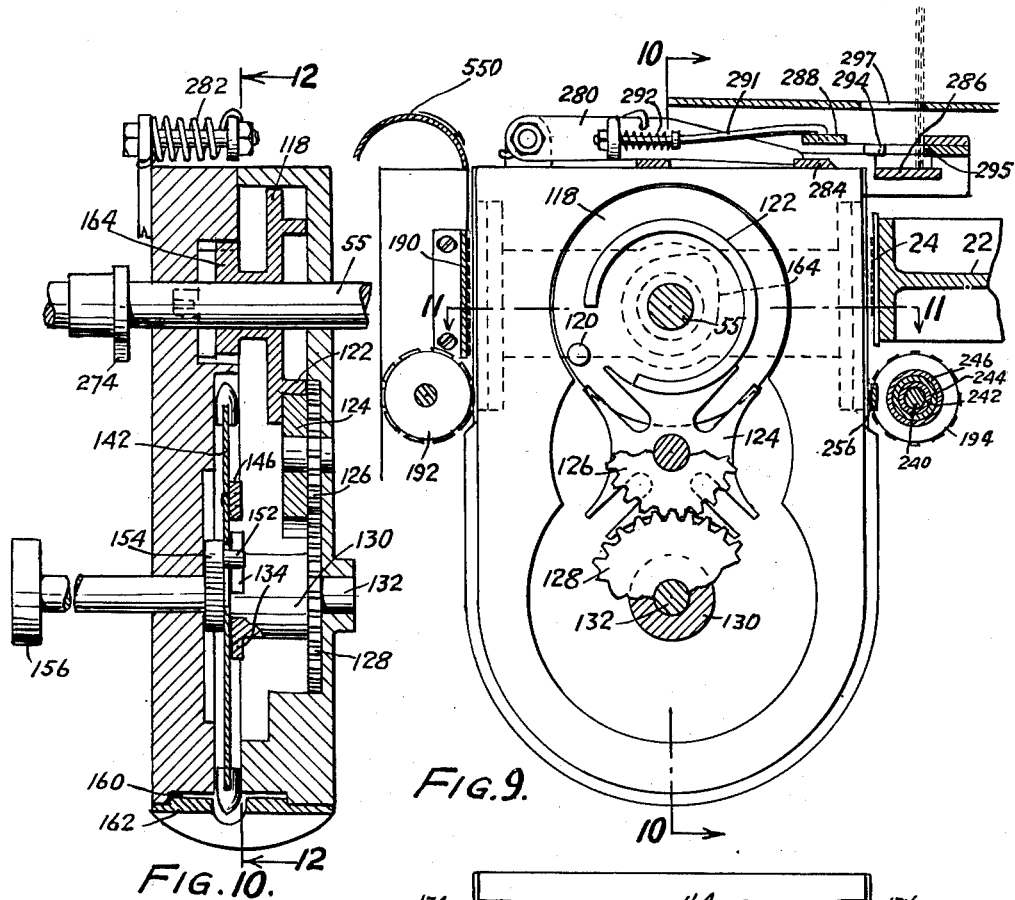
FIG. 9.
FIG. 10.
FIG. 11.
FIG. 12.
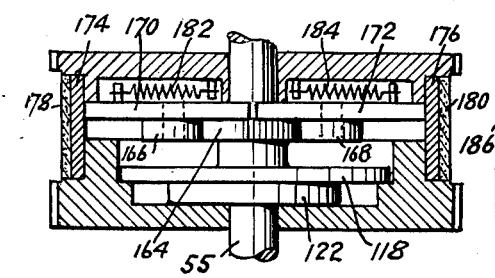
WITNESS:
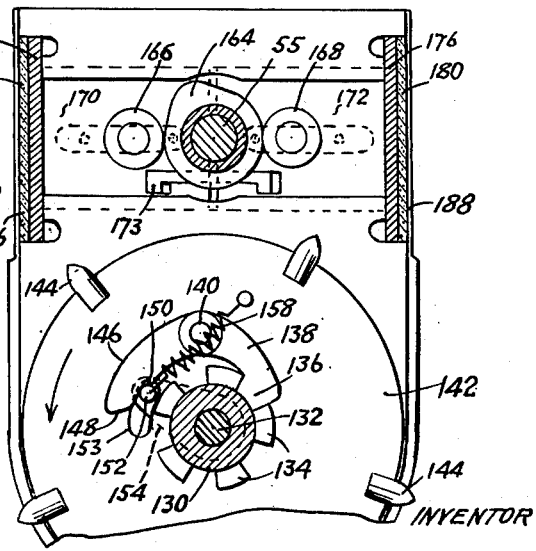
INVENTOR
Reuben H. Helsel
BY
Busser & Harding
ATTORNEYS

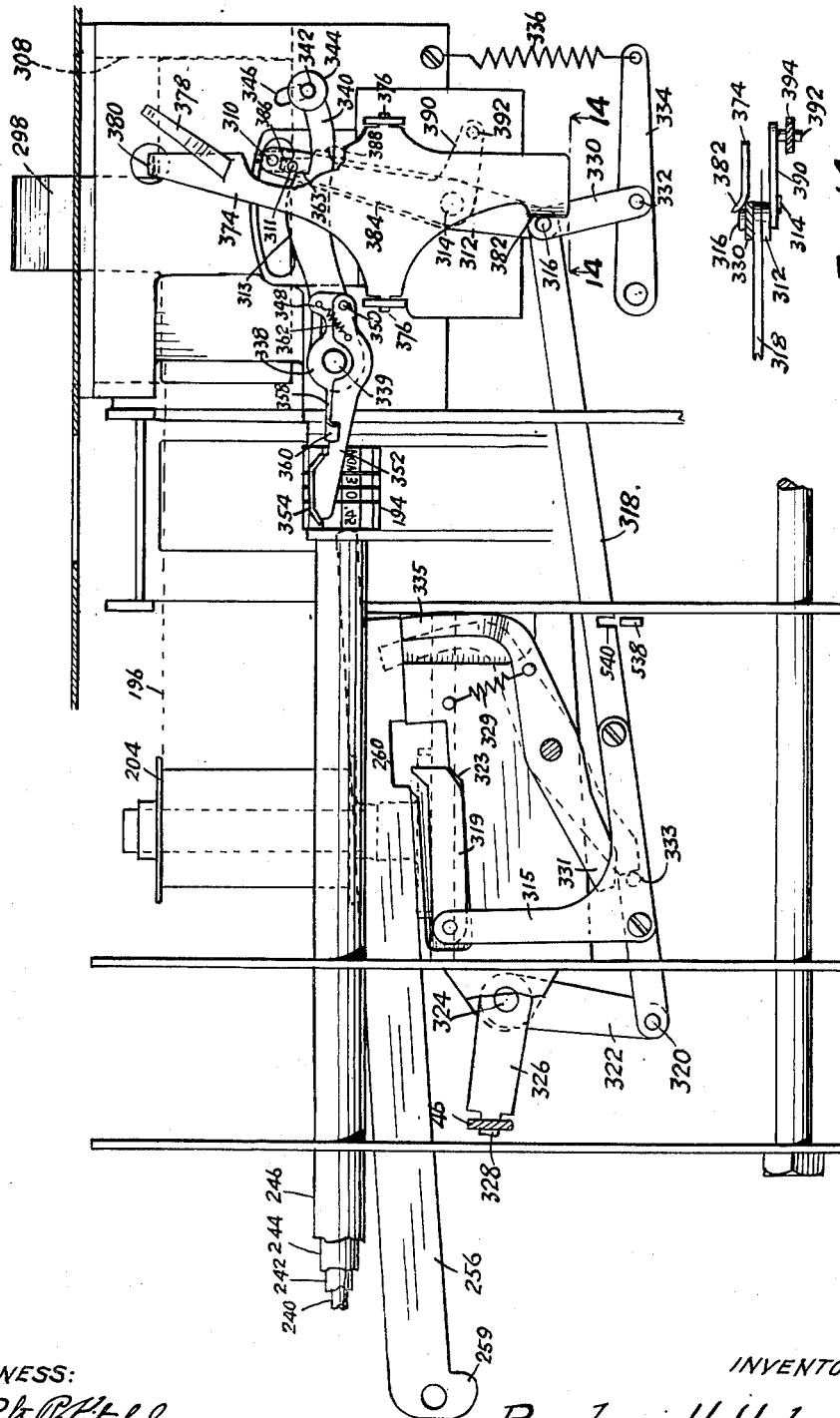

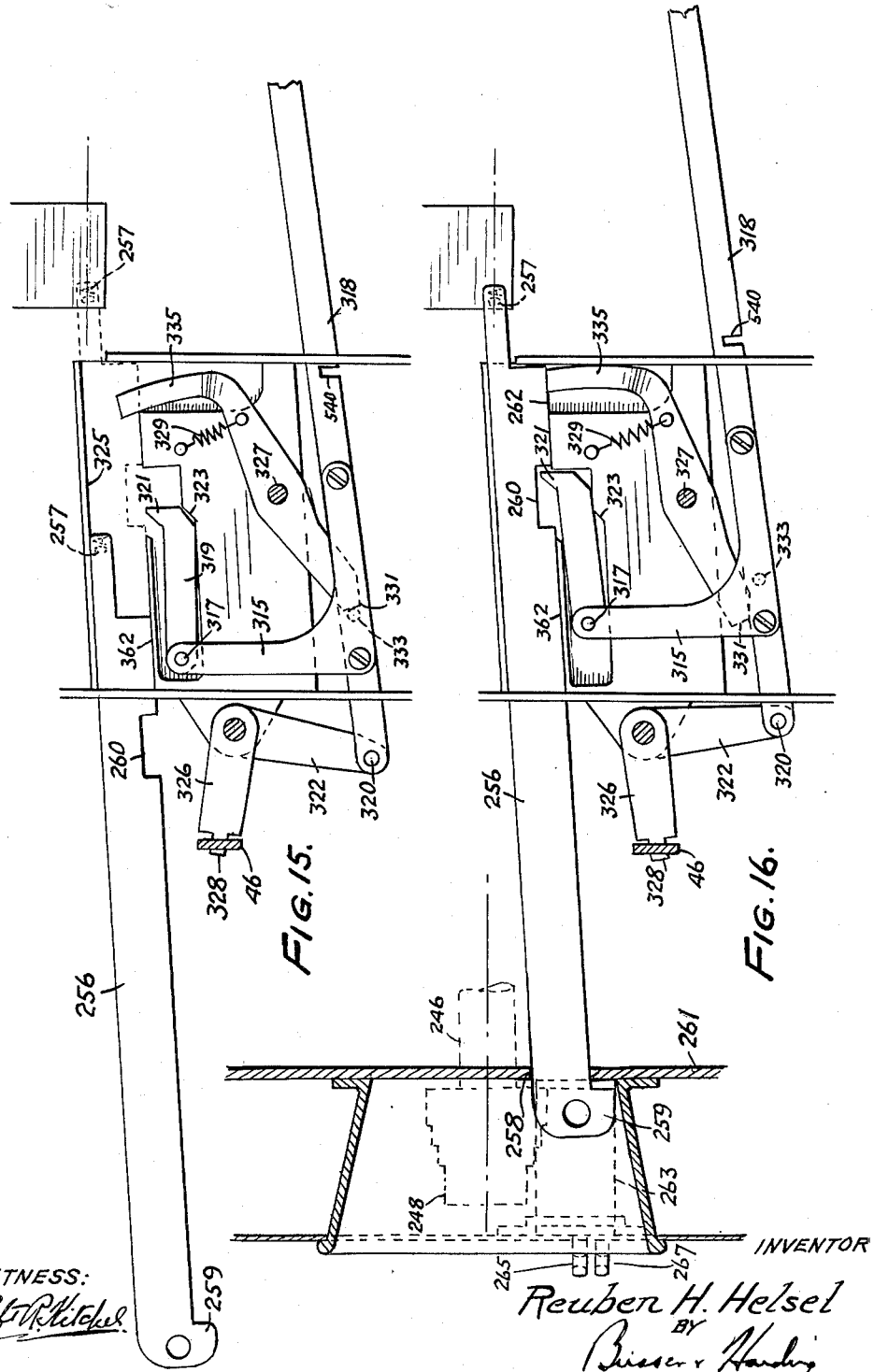

June 24, 1952   R. H. HELSEL   2,601,283
TICKET ISSUING MACHINE
Filed Dec. 13, 1945   12 Sheets-Sheet 9
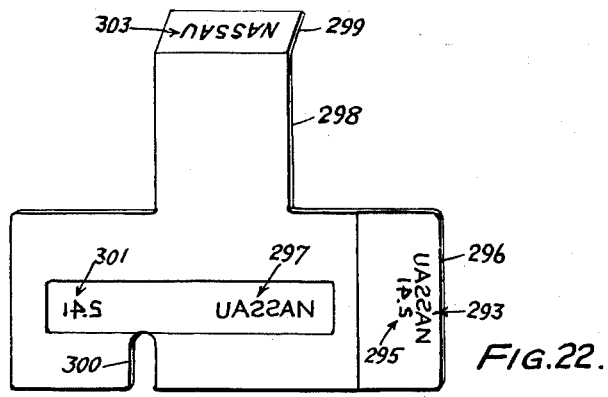
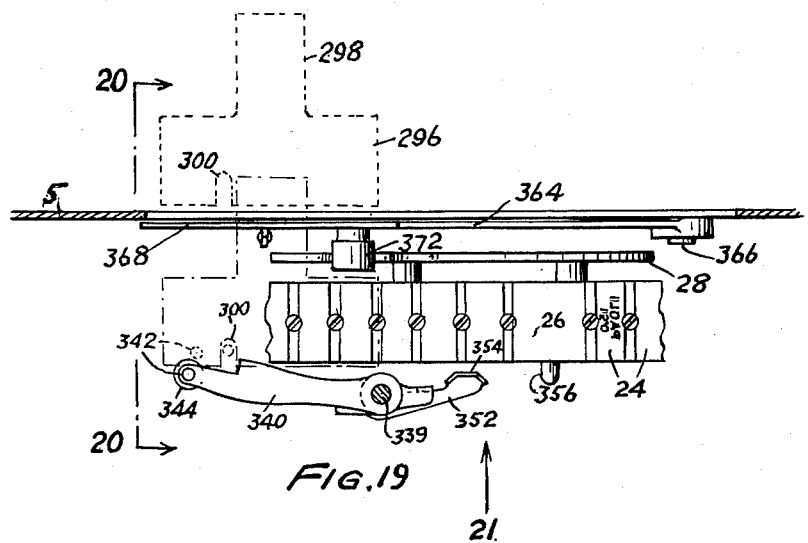
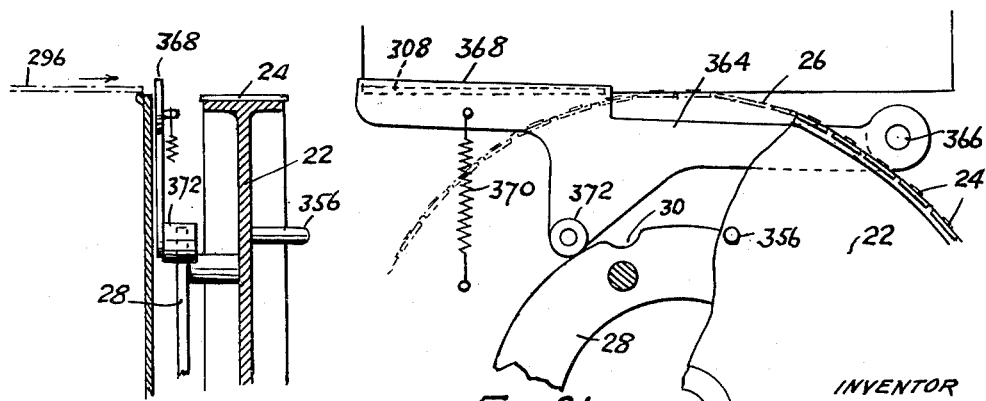
WITNESS:
INVENTOR
Reuben H. Helsel
BY
ATTORNEYS.

June 24, 1952 R. H. HELSEL 2,601,283
TICKET ISSUING MACHINE
Filed Dec. 13, 1945 12 Sheets-Sheet 10

WITNESS:
R.F. Mitchell

INVENTOR
Reuben H. Helsel
BY
Busser & Harding
ATTORNEYS.

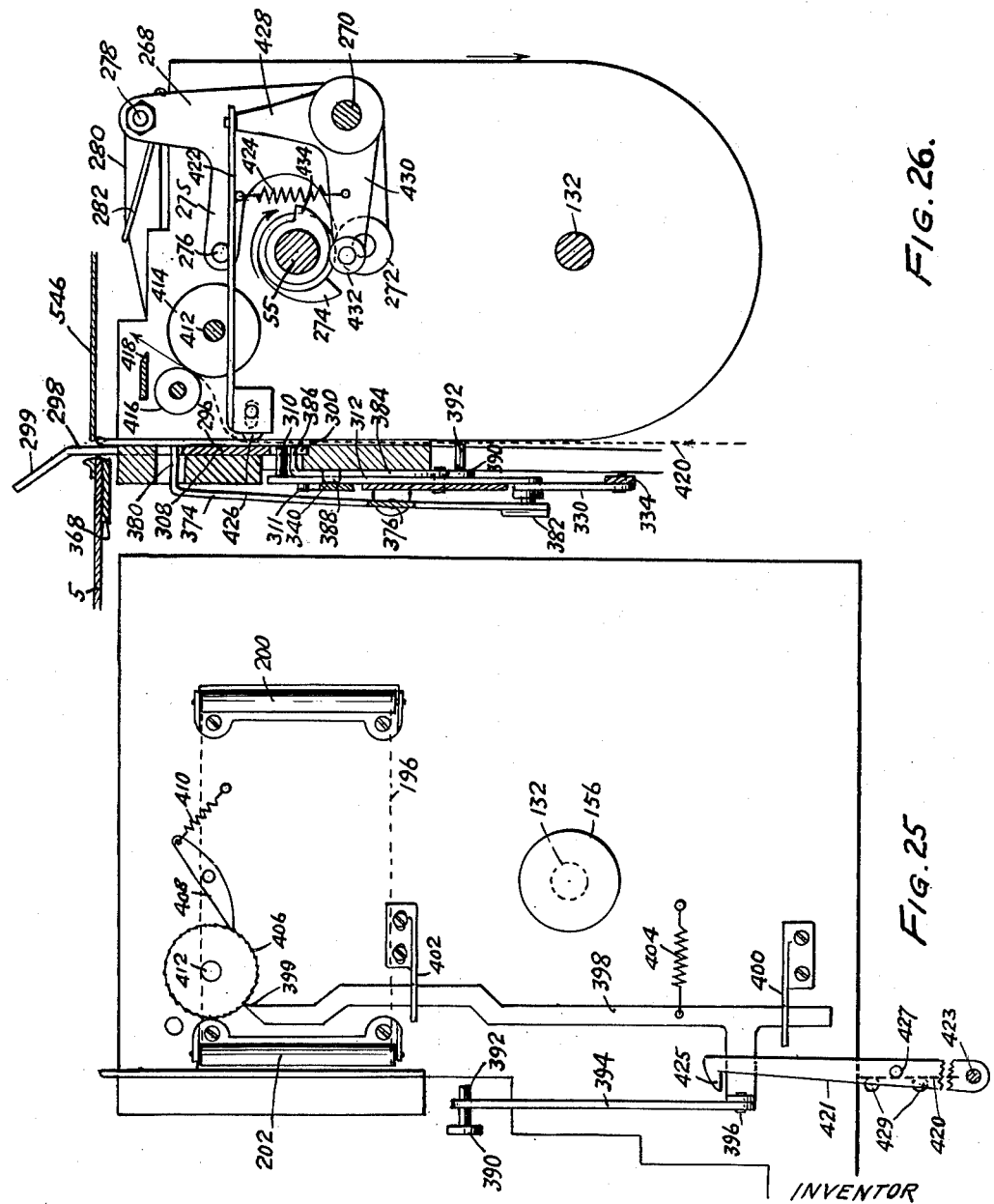

Patented June 24, 1952

2,601,283

UNITED STATES PATENT OFFICE 2,601,283

TICKET ISSUING MACHINE

Reuben H. Helsel, Long Island City, N. Y., assignor, by mesne assignments, to General Register Corporation, Long Island City, N. Y., a corporation of New York Application December 13, 1945, Serial No. 634,697

13 Claims. (Cl. 101—66)

This invention relates to a machine for issuing tickets, particularly for railroads, busses, air lines etc. The invention is also applicable to other machines in which a large variety of different tickets is to be printed.

The broad object of the invention is the provision of a suitable machine for the issuance of tickets of the general type indicated. In the matter of issuing tickets for common carriers it is particularly useful inasmuch as it avoids the necessity for stocking large numbers of tickets and it facilitates accounting of sales. At present, a station is required to stock printed tickets for all of the various destinations for which tickets may be sold from that station. The common practice with respect to railroad tickets will indicate the major advantages of the present invention. Each ticket agent in the station generally has his own individual case of tickets which is kept locked when he is off duty. He is responsible for the tickets in his case. Beyond the matter already printed on the tickets the only step in the direction of validation thereof is the printing on the back of the ticket of the date and possibly some additional matter by means of a rubber stamp. The stamped matter can be very easily duplicated by anyone desiring to practice a fraud and consequently it may be considered that the tickets represent a corresponding value in money which necessitates precautions against fraud or larceny. Accounting of the sales of tickets is also quite complicated inasmuch as the tickets must be counted in order to ascertain the stock on hand. In the case of an active station it will be evident that keeping track of the tickets and insuring against theft or fraud involve much expenditure of care and labor.

The machine of the present invention is designed to print tickets only as the tickets are issued for sale. The stock which is at any time on hand in the station consists solely of either blank ticket strip or strip which is only partially machine printed so that an attempt to complete a ticket fraudulently is a matter of some difficulty and ordinarily would be easily detectable.

While as indicated above the machine may be used for other purposes it is particularly designed for the issuance of tickets for common carriers. A machine to be successful for this purpose must be capable of issuing a very large variety of different tickets. In the case of a busy station in a large city or a station on the main line of a railroad there is posed the problem of building into the machine the possibility of issuing tickets to all of the stations served from the origin station and this end must be achieved consistently with ease of manipulation of the machine to select the tickets. In accordance with the present invention a rotary carrier provides a mounting for type elements capable of printing, for example, tickets to be issued to fifty distinations or tickets of various different types, such as coach and pullman tickets, to be issued to a less number of destinations. Capability of selection of fifty different destinations or types of tickets is, however, inadequate to take care of the traffic at a busy railroad center and consequently, in accordance with the invention, provision is made so that the machine may print tickets to additional and minor destinations with slightly more trouble in manipulation than in the case of the issuance of tickets to major stations. The machine, accordingly, in its preferred form has built into it the possibility of very easy selection of a large number of different tickets, for example fifty, and is made capable of issuing tickets in addition to these by the insertion of slugs carrying the necessary type, which slugs may be supported in a convenient rack and placed in the machine by the ticket agent. These slugs are so arranged as to print on the ticket solely such partial matter as a destination so that the slugs themselves do not represent any such valuable property that they could be used apart from the machine in providing valid tickets.

The machine is provided with individual counting devices for the purpose of registering tickets issued to the major stations, the selection of which is accomplished within the machine itself. For the purpose of recording tickets issued to minor stations the machine is provided with devices for feeding a paper strip, or a pair of strips with carbon between them, on which the issue of these latter tickets may be printed, together with the price thereof. The paper strip taken periodically from the machine may be readily checked to determine the number of tickets issued to these stations and the total value of the sales involved. In its preferred form the machine not only prints the destination on the ticket but also prints the origin station which further reduces the possibility of fraud. In accordance with the invention the printing of the origin station, as well as a serial number is accomplished on a ticket area subsequent to the leading ticket area simultaneously with the printing of the destination on the leading ticket, to simplify the mechanical arrangement. However, even the area printed with the origin station and serial number is located in a portion of the machine to which access is normally impossible so that the partially printed area cannot be secured from the machine for the purpose of fraudulently completing the ticket to simulate a valid one. At the time of printing of the origin station it is, of course, possible to print other matter on the ticket such as the conditions of sale or the like, though this other matter may, if desired, be preprinted on the ticket strip. Alignment of the various printed matters may be insured by utilizing a perforated ticket strip fed by means of pinwheels or the like so that the ticket areas are properly lined up with the various printing devices.

In an issuing operation of the machine it is also desirable to print on the ticket the date of issue, which avoids the necessity of later stamping of the ticket, and additionally a code indication of the ticket agent. The latter is accomplished by providing a "key," individual to each agent, which must be inserted in the machine in order to render it operative. By reason of this a number of different agents may use the same machine which may accordingly be permanently installed at the ticket window. Provision is made as hereafter described for the issue of dummy tickets by the various agents to indicate, in conjunction with the printing of the serial number, when in the course of a day's activity an agent goes on or off duty.

Desirably, the price of the ticket is also printed thereon, thus making unnecessary reference by the ticket seller to a rate book to ascertain the price.

The invention also involves the provision of various interlocks to avoid cheating and misrecording of the issued tickets, for example, by preventing any changes in the setting of the machine during its cycle of operation, and by preventing any simultaneous operations of the different types indicated above, i. e., by selection within the machine and through the use of the removable slugs.

The machine is further provided with locking means making accessible only to particular persons various parts of the machine which could possibly be manipulated for fraudulent purposes.

The machine is further provided with means for signalling the approaching exhaustion of the ticket strip and for locking the machine when the ticket strip is exhausted. Provision is also made to lock the machine against operation by the use of a slug when the record strip is exhausted.

In addition to the above objects of the invention there are numerous objects relating particularly to mechanical features of the machine which will be best understood from the following description and accompanying drawings. The major ones of these objects have to do with ease of selection and operation, reliability of operation, the attainment of proper sequence of events in a cycle of operation, the stacking of a group of tickets issued in a single transaction, and the like.

In the drawings:

Figure 1 is a top plan view of the machine showing in particular the selecting device, the recording counters, the issue opening, and the slug-receiving opening;

Figure 2 shows a typical railroad ticket such as may be issued by the machine;

Figure 5 is a left-hand side elevation of the machine with the side cover plate removed;

Figure 9 is a sectional view showing in particular the various printing elements and the feeding and cutting means for the ticket strip, and the stacking means for a plurality of tickets;

Figure 10 is a section taken on the plane indicated at 10—10 in Figure 9;

Figure 11 is a section taken on the plane indicated at 11—11 in Figure 9;

Figure 12 is a section taken on the plane indicated at 12—12 in Figure 10;

Figure 13 is a view looking upward and at the rear of the mechanism showing in particular certain interlocks and the adjusting means for the dating head;

Figure 14 is a fragmentary view taken on the plane indicated at 14—14 in Figure 13;

Figures 15 and 16 are fragmentary sectional views illustrating in particular the interlocks associated with an individual agent's key;

Figure 17 is a perspective view showing the appearance of the controls for the dating head;

Figure 18 is a fragmentary vertical section taken on the plane indicated at 18—18 in Figure 5;

Figure 19 is a fragmentary sectional view showing in particular certain of the interlocking elements, some of which are also illustrated in Figure 13;

Figure 20 is a sectional view taken on the plane indicated at 20—20 in Figure 19;

Figure 21 is a bottom view of the matters of Figure 19 viewed in the direction of the arrow 21 in Figure 19;

Figure 22 is a perspective view of one of the removable slugs designed to print and record tickets issued to minor stations;

Figure 25 is an elevation viewed in the direction of the arrow 25 in Figure 7 and showing in particular the means for feeding the record strip;

Figure 26 is a section taken on the plane indicated at 26—26 in Figure 7;

Figure 3:
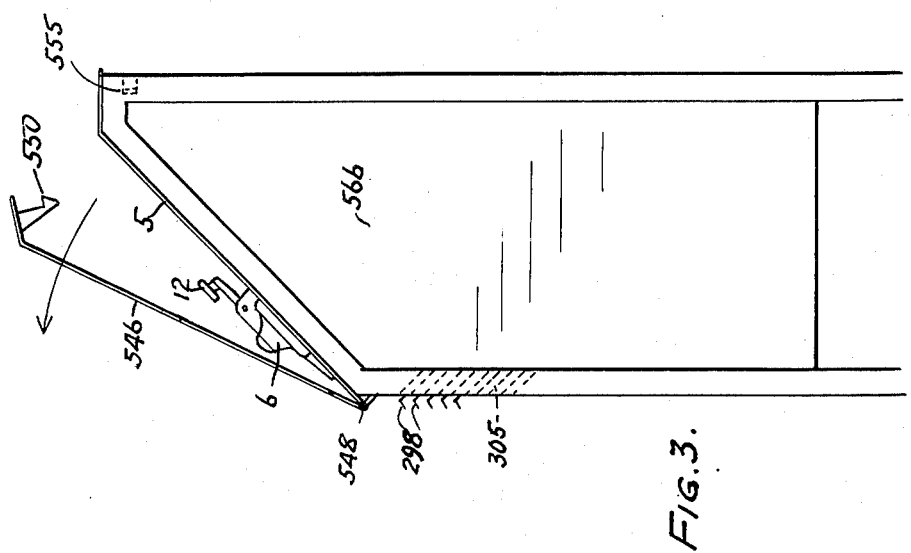
Figure 3 is an elevation of the right-hand side of the machine showing the cover plate part-way open.
Figure 6:
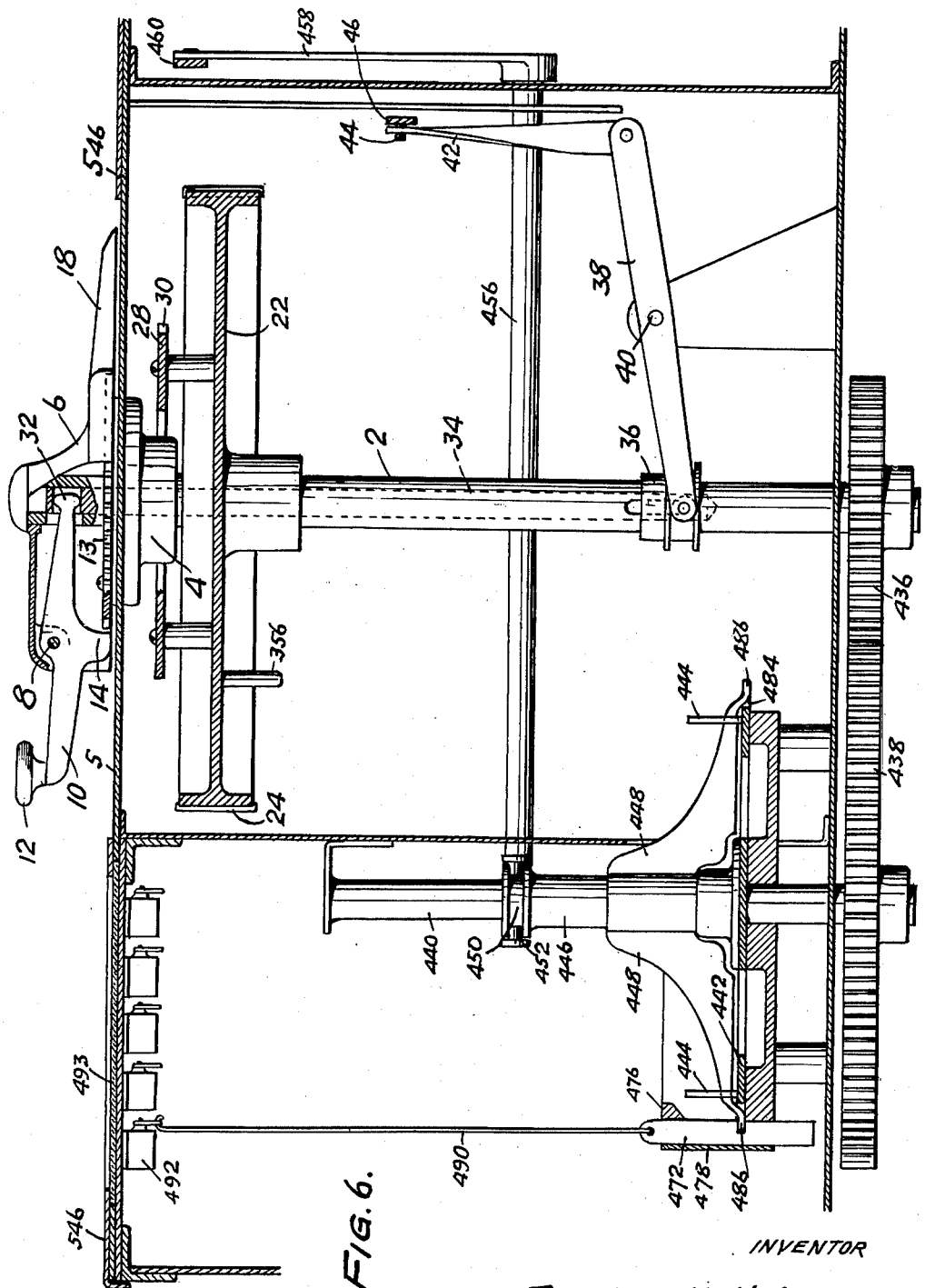
Figure 6 is a sectional view looking from the rear of the machine toward the front thereof and particularly illustrating the selecting means and connections to the individual destination registers.
Figure 7:
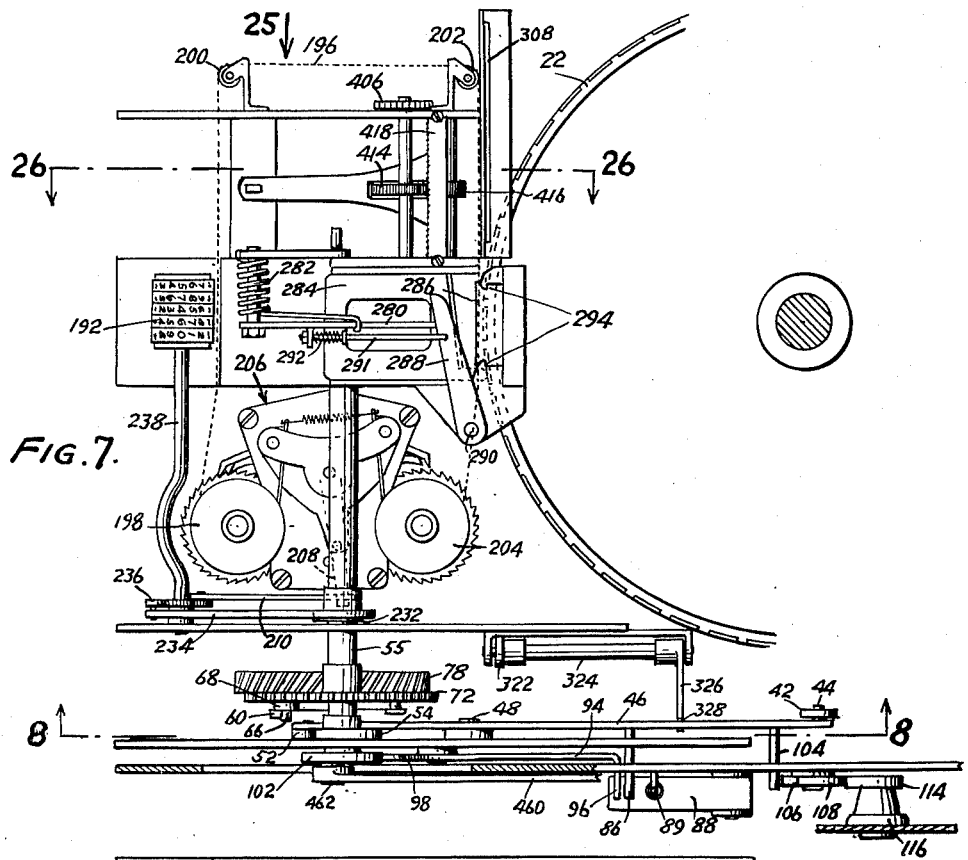
Figure 7 is a fragmentary plan view of the parts below the top cover of the machine, showing in particular certain control elements, the inked ribbon feeding means, the severing knife and stacking means and the means for feeding the strip on which the issue of tickets to minor stations is recorded.

A shaft 2 is mounted in an upper bearing 4 carried by a main top plate 5 of the machine which, as indicated in Figures 3 and 5 slopes in such fashion that exposed parts of its upper surface are visible and convenient to an operator. Secured to the upper end of the shaft 2 is a cap 6 provided with a laterally extending portion wherein there is pivoted upon a pin 8 a lever 10 provided with a manipulating knob 12. A depending portion 14 of the lever is arranged to cooperate with an externally toothed member 13 fixed to the plate 5 and so arranged that accurately predetermined positions of the shaft 2 correspond to engagement of the portion 14 of the lever between the teeth. A pointer 18 carried by the cap 6 and movable closely adjacent to the table moves in proximity to index markings such as indicated at 20 with which are associated the names of stations to which tickets may be issued when the shaft 2 is in various positions. If several types of tickets, such as coach and Pullman tickets, may be issued to a single station, the ticket type may also be designated.

Beneath the plate 5 the shaft 2 carries a drum 22 to the periphery of which there are secured type plates 24 which are evenly located about its periphery in correspondence with the number of teeth on the member 13 with the exception of a gap equivalent to two of the type plate spaces, in which gap there is located a blank plate 26. As pointed out hereafter this blank plate merely provides a backing for removable printing slugs.

The drum 22 carries a circular plate 28 having a notch 30 in one position therein for a purpose hereafter described.

The inner end 32 of the lever 10 engages within an opening in the upper end of a rod 34 slidable within the bore of the hollow shaft 2. The lower end of this rod is secured to a collar 36 by a pin passing through an elongated slot in the shaft 2. Within an annular groove in the collar 36 there engages a follower on one end of a lever 38 pivoted to the frame at 40 and connected at its opposite end by a link 42 to a pin 44 carried by a lever 46 located adjacent to the left-hand side of the machine, this being pivoted to the frame at 48. The rearwardly extending portion of the lever 46 is provided with two arms 50 and 56. The former is provided with a follower roller 52 and is arranged to be operated upon by a cam 54 carried by the main shaft 55 of the machine. The other arm 56 is arranged to interengage with the lower end 58 of a lever 60 pivoted at 62 and provided with a step 64 near its upper end engageable by a pin 66 carried by a gear segment 68 pivoted at 70 to a gear 72 and urged in an outward direction by a spring 73. This segment is so arranged that in its outer position, as limited by engagement of pin 75 carried by gear 72 with the end of an opening 77 in the segment, its teeth are continuous with the teeth of the gear 72 to form, in effect, a complete gear capable of meshing with the pinion 74 carried by the shaft 76. On the other hand, when the segment is rocked inwardly as hereafter described its teeth will be carried out of mesh with the pinion 74 which may then rotate without driving the shaft 55.

The shaft 76 carries a wheel 78 arranged to be driven by a worm 80 mounted on the upper end of a shaft 82 provided with universal joints and driven by a motor 84.

The lever 46 carries an outwardly extending pin 86 which overlaps a plate 88 of insulating material urged upwardly by a spring 89 and carrying a contact leaf 90 engageable with a stud 92 to close the motor circuit. There may, if desired, be interposed in this circuit a manually operable master switch 93.

A lever 94 pivoted to the frame at 95 is provided with a turned end 96 overlying the plate 88 for the purpose of holding the switch closed during the latter portion of each cycle of operation of the machine. An upright arm 98 of the lever 94 is held by a spring 100 in engagement with a cam 102 carried by the shaft 55.

A pin 104 carried by lever 46 is arranged to cooperate with a ledge 106 of a lever 108 pivoted to the frame at 110 and urged downwardly by a spring 112 into contact with a cam 114 carried by the rotatable barrel of a lock 116 which may be manipulated by a key for the purpose of locking up the machine. When the machine is being operated the cam 114 is swung to the position illustrated in Figure 5 so that the ledge 106 is out of the path of the pin 104 and the lever 46 may be depressed. When the cam 114 is rotated counterclockwise as viewed in Figure 5 the ledge 106 is brought beneath the pin so that the lever 46 cannot be moved downwardly either to trip the clutch or to energize the motor.

The unit which guides and advances the ticket strip and effects printing and cutting of the same is particularly illustrated in Figures 9 to 12, inclusive. The main shaft 55 carries the driving member 118 of a Geneva mechanism which includes a driving pin 120 and a locking arc 122. The driven member of the Geneva mechanism is of conventional type indicated at 124 and carries a pinion 126 which meshes with a pinion 128 carried by a hub 130 journaled upon a shaft 132. The arrangement is such that a single rotation of the shaft 55 will produce a quarter rotation of the driven Geneva element 124 and a fifth of a rotation of the hub 130.

The hub 130 is provided with five teeth indicated at 134 between which there is arranged to engage the nose 136 of a lever 138 pivoted at 140 to a pinwheel 142 which is provided with five pins 144. A different number of these pins may, of course, be provided, with corresponding changes in the driving mechanism, but the five pins indicated are desirable since, consistent with a proper ticket length, there is always insured engagement of the ticket strip by three pins which distribute the driving forces on the strip.

The tail portion 146 of the lever 138 is provided with a bevelled end 148 and a seat 150 arranged to cooperate with a pin 152 which is carried by an arm 154 secured to the shaft 132 and urged in a clockwise direction relative to the pinwheel by a spring 158 as illustrated in Figure 12. The shaft 132 is provided with a knob 156 accessible at the right hand end of the unit inside the casing.

The arrangement just described is provided for the purpose of making possible the threading of a strip through the machine independently of the driving mechanism. Under ordinary conditions the spring 158 holds the pin 152 in the seat 150 of the lever 138 so that its nose 136 is held between the teeth 134, and the pinwheel is thus locked to the hub 130 so as to rotate as a unit therewith. When, however, it is desired to rotate the pinwheel independently for the purpose of threading a ticket strip into the machine the knob 156 may be rotated so as to turn the shaft 132 counterclockwise as viewed in Figure 12. When this is done the pin 152 is rocked against the action of the spring 158 out of the seat 150 and below the bevelled end 148 of the lever 138. Then, either due to the tension imparted to the spring 158, or more positively by engagement of the pin 152 with the end of the slot 153 in the pinwheel through which it projects, the pinwheel is forcibly rotated in such fashion that the lever 138, now free, is cammed outwardly by a tooth 134 and the pinwheel is thus free to rotate independently of the hub 130. Due to the presence of the spring 158 the motion so imparted to the pinwheel is interrupted by the fact that the nose 136 drops into each notch between the teeth 134 until pulled therefrom by further movement of the shaft 132. The operator accordingly experiences a series of clicks through the knob 156 enabling him to count the ticket length advanced by the pinwheel. As soon as the knob is released after the operator feels the entry of the nose 136 between a pair of teeth 134 the locked situation of the pinwheel to the hub 130 occurs so that the machine is ready for operation. The knob 156 is normally inaccessible, being behind the right hand cover plate, but may be reached through the doors at the rear of the machine as hereafter described. It may be noted that the manual feed of the pinwheel in the opposite direction by manipulation of the knob is impossible. It is also impossible to move the strip in either direction by pulling thereon.

The unit indicated in Figures 9 to 12, inclusive, is provided with a U-shaped passageway 160 for the ticket strip which is provided with a cover as indicated at 162. The guideway 160 is so arranged as to hold the ticket strip in position for entry of, and feed by, the pins 144.

A cam 164 is provided on the shaft 55 for the purpose of actuating a pair of platens to produce printing impressions. The cam 164 acts upon rollers 166 and 168 carried by the respective slides 170 and 172 which are urged inwardly by springs 182 and 184. The slides carry plates 174 and 176 which are faced with yielding platens 178 and 180 arranged to press the ticket strip outwardly against the inking ribbon and the type. While the springs 182 and 184 normally suffice to withdraw the platens from the ticket strip, positive withdrawal is insured by the loose interlock of a member 173 in notches in the slides so that when either is projected, the other is retracted. Guideways 186 and 188 are provided for the portions of the ticket strip adjacent to the printing elements. These elements comprise a fixed type plate 190, a numbering head 192, a dating head 194 and the elements for printing destinations which are carried either by the drum 22 or constituted by removable slugs as hereafter described. Additionally, as hereafter pointed out, printing is accomplished by means of type on the end of operators' keys 256. The printing is accomplished by the interposition of an inked ribbon 196 between the type and the ticket strip, this inked ribbon also serving for the printing of the record of tickets issued through the use of slugs. The ribbon passes to or from a reel 198 past the rear type, about guide rollers 200 and 202 and past the front type from or to a reel 204.

The ribbon feeding means is indicated generally at 206 and is of the pawl and ratchet reversing type described in my application Serial Number 591,383, filed May 1, 1945, now Patent Number 2,554,827, patented May 29, 1951. It forms no part of the present invention and hence need not be described in detail. The pawl carrier 208 is rocked by a link 210 which serves by its oscillation to advance the ribbon.

The numbering head 192, which may be of conventional form, is operated by oscillation of a shaft 238 upon each rotation of the shaft 55. For this purpose an eccentric 232 on the shaft 55 operates a lever 236 on the shaft 238 through a strap 234. A depending arm 212 of this lever is connected to the link 210 to actuate the ribbon feed.

The dating head 194 comprises a series of four type cylinders which respectively print the month, the tens and units values of the days, and the year. These type cylinders are connected to a series of nested shafts 240, 242, 244 and 246 which extend through the left hand end of the machine and are there provided with respective drums 248, 250, 252 and 254 (see Figs. 17 and 18) which carry visible markings and are manipulable so that the operator of the machine may readily set the type drums of the dating head to the dates to be printed upon the tickets.

In order that the individual operator of the machine may impress upon the tickets a code indication by which he may be identified each operator has an individual key or slide 256 which he may enter through a slot 258 in the left hand end of the machine to locate it in position for printing the operator's identification type 257 carried by its inner end. The key is provided with a head 259 which limits the extent of its insertion, and with a notch 260 and lower edge portion 262 which take part in an interlocking action hereafter described.

To prevent the insertion of any key, a slide 263 is provided, mounted on the left hand side plate of the machine and arranged for movement across the slot 258. A perforated ear 265 carried by the slide and projecting through the side plate may be brought into alignment with a perforated ear 267 fixed to the side plate, and a padlock may be inserted through both ears to lock the slide. The key to this padlock may be retained by some authorized person to prevent any insertion of a key.

A lever 268 (Fig. 26) pivoted upon a stud 270 is provided with a cam following roller 272 arranged to be acted upon by a cam 274. A pin 276 carried by a second arm of the lever 268 is also arranged to be acted upon by the cam 274 to serve for its positive return after a forward movement in the event normal return does not occur as referred to hereafter. To the upper end of the lever 268 there is pivoted at 278 an actuating arm 280 for the movable knife 284 which cooperates with a fixed blade 286 to sever the ticket strip by movement across the path thereof. A strong spring 282 holds the arm 280 downwardly to keep the knife 284 in tight sliding cutting relationship to the blade 286. This spring also normally causes the knife to retract as will be understood from its function in tending to decrease the angle between lever 268 and the arm 280. Unless unusual friction intervenes, therefore, the action of cam 274 on pin 276 is unnecessary to retract the knife. Arranged above the blade 286 is a finger 288 pivoted to the frame at 290 and movable yieldingly by the arm 280 through a push rod 291 and an interposed spring 292, acting on a collar on the rod. This finger engages a ticket approximately simultaneously with the cutting thereof and presses the lower end of the severed ticket forwardly so that its upright edges will pass in front of retaining hooks 294 which overlap the fixed blade 286 and in conjunction with the edge 295 of the plate carrying them form a ticket receiving and supporting space. The ticket, subsequent to cutting, is thus pushed forwardly out of alignment with the opening behind the fixed blade 286 so that it cannot thereafter drop behind the same. At the same time, it is held out of the path of the advancing end of the ticket strip during the next cycle of operation. It is also yieldingly held between the sides of the members which carry the hooks and projects through the opening 289 in the top plate 5 of the machine. As a result of this, if a number of similar tickets are to be issued in a single transaction the operator can effect repeated operations of the machine and the tickets so issued will be stacked together projecting from the opening 289 so that they may be removed as a group by the operator.

As indicated above the destinations to which a minor amount of traffic is expected are printed on the tickets not by the type on the drum 22 but by slugs 296 which are provided with extensions 298, the outer ends of which may be deflected as at 299, by which they may be grasped for placement in the machine or removal therefrom. These slugs carry type as follows. At 293 there is the destination, associated with which may be the price of the ticket at 295. The type 293 and 295 is adapted to print the ticket. The type at 297 and at 301 print, respectively, the destination and price on a record strip hereafter described to provide a record of each ticket issued by the slug. For identification of the slugs the destination may be printed thereon at 303 so as to be visible when the slugs are held in the sloping racks indicated at 305 in Figure 3. The lower edge of each slug is provided with a notch 300.

Each of the slugs 296 is arranged to be inserted into a slot 308 provided in the plate 5 of the machine and by portions of the frame so that the slug may be guided for horizontal movement in an edgewise direction. When the slug is in place the notch 300 in its lower edge embraces the inner end of a pin 310 carried by the upper arm of a lever 312 pivoted on a stud 314. A pin 316 on the lower arm of this lever is connected by a link 318 to a pin 320 on the depending arm 322 carried by a shaft 324 which is provided with a second arm 326 having a reduced end 328 engaging within an opening in the lever 46. Also pivoted to the pin 316 is a toggle link 330 pivoted at 332 to an arm 334 urged upwardly by a spring 336. The arrangement is such that the pin 316 moves over a dead center so that in operation the spring 336 will yieldingly snap the lever 312 to either its right hand or left hand position.

A hub 338 mounted on a stud 339 has an arm 340 carrying a pin 342 and a weight 344 normally urging the arm to the position indicated in Figure 13. The pin 342 extends upwardly across the lower edge of the slug, passing for this purpose through a slot 346 in one of the plates which forms the lower boundary of the slug receiving slot 308. A second arm 348 carried by the hub 338 has pivoted to it at 350 an arm 352 carrying cam surface 354 which is arranged to be engaged by a pin 356 on the drum 22 when the blank backing element 26 on the drum is in alignment with the ticket strip. A third arm 358 carried by the hub 338 is provided with a lateral extension 360 overlapping the upper edge of the arm 352. The arm 352 is held in contact with this extension by a spring 362. A shoulder 363 on the arm 340 is arranged to be movable across the path of a pin 311 carried by the lever 312 whenever the pin 342 moves toward the upper end of the slot 346 in which position it would extend across the normal position of the lower portion of the slug 298. A cam surface 313 on the lever 340 is adapted to be engaged by the pin 311 for the purpose hereafter described.

An arm 364 pivoted on a stud 366 has a gate portion 368 which may move across the slot 308 so as to prevent the insertion of a slug. Conversely, when a slug is inserted this arm will be held in a lower position as indicated in Figure 26 by the slug. A spring 370 normally urges a roller 372 carried by the arm 364 into contact with the ring 28. When the drum 22 is in a position with the backing element 26 opposite the ticket strip the roller 372 may enter the notch 30 so that the slot 308 is cleared for insertion of the slug. When a slug is within the slot the location of the roller 372 in the notch 30 will prevent rotation of the drum 22.

A plate 374 is pivoted by means of ears 376 in the frame, its forward edge being urged downwardly by a leaf spring 378 carried by it at 374 and bearing upon a portion of the frame. The plate 374 has a turned end 380 which may project upwardly across the slot 308 and over the upper or forward edge of a slug 298 when a slug is inserted, the purpose being to prevent the slug from being removed during a cycle of operation. The lower end of the plate is provided with a turned cam portion 382 arranged to be engaged by the pin 316 so that whenever the lever 312 is rocked counterclockwise from the position illustrated in Figure 13 the end 380 of the plate will be rocked against the action of the spring 378 so as to overlie the upper edge of the slug.

Pivoted on the pin 314 is a second lever 384 provided with a turned end 386 which also enters the notch 300 in the slug, the arrangement being such that when the slug slides to the left from the position indicated in Figure 13 under the action of the pin 310, the lever 384 will be rocked counterclockwise. The lever 384 is provided with an ear 388 overlapping the lever 312 so that as this lever 312 moves clockwise the lever 384 will be forced to do likewise, though in the absence of a slug the lever 384 will not follow the counterclockwise movement of lever 312. An arm 390 of the lever 384 carries a pin 392 with which is engaged a link 394 (Fig. 25) pivoted at 396 to a slide 398 which is guided for sliding movement in a slot in a bracket 400 and is loosely guided in an enlarged slot in an adjustable bracket 402 so that the pointed pawl end 399 of the slide may be urged by a spring 404 into engagement with the fine teeth of a ratchet 406. By adjustment of bracket 402 the point at which pawl 399 first engages the ratchet may be adjusted so that the extent of rotation of the ratchet in each stroke of the pawl may be regulated. Cooperating with the ratchet 406 is a detent 408 controlled by a spring 410. The ratchet 406 is secured to a shaft 412 which carries a knurled feed roller 414 between which and a cooperating roller 416 there is pinched a paper strip 420 arranged to receive data printed by the slug to indicate the minor traffic stations and the values of tickets issued thereto. The strip 420, may, if desired, be a multiple one with carbon located between the component sheets, for example as a backing on the front sheet or other sheets, so that duplicate records may be made. A serrated blade 418 is located in position above the rollers 414 and 416 so that at proper times the paper may be torn off for accounting purposes. The paper may be freely pulled upwardly so as to bring above the blade 418 the last printed matter appearing thereon. The portion of the paper which has been printed may be removed by opening the door 507 in the cover plate 506 of the machine, which cover plate is normally locked closed by means of a lock 509 so as to prevent unauthorized removal of the record strip.

In order to prevent operation of the machine by the use of a slug when the paper strip 420 is exhausted, a lever 421 is pivoted at 423 to the frame and is provided with a feeler pin 427 which rides on the strip as the strip passes over fixed pins 429 also carried by the frame. The lever 421 is provided with a hook 425 arranged to move over the laterally turned ear of the slide 398 when the strip is exhausted, this action occurring due to gravity, it being understood that the parts illustrated in Figure 25 actually slope in the machine with the left-hand portion of that figure extending downwardly. By the arrangement just described it will be evident that an exhaustion of the record strip will lock the machine against operation involving the insertion of a slug although the machine may operate in its usual fashion through drum selection, the reason being that the slide 398 operates only when the slug is moved to the left and carries with it the lever 384.

For the printing of the records on the record strip there is provided a slide 422 which carries a yielding platen element 426 arranged to press the paper strip 420 against the inked ribbon and the type carried by the slug. This slide 422 is connected to one arm 428 of a bell crank pivoted on the stud 270, the other arm 430 of which carries a roller 432 engageably by a cam 434 on the shaft 55, engagement being maintained by a spring 424 tensioned between the lever arm 439 and the slide 422.

A gear 436 secured to the shaft 2 drives a gear 438 of twice the pitch diameter of the gear 436. The gear 438 is secured to a shaft 440 which carries a circular plate 442. A sleeve 446 is slidable on the shaft 440 and carries a pair of arms 448 which extend through upright slots provided between arms 444 of brackets secured to the plate 442. The arms 448 and sleeve 446 are thus constrained to rotate with the shaft 440 though they may slide axially relatively thereto.

The sleeve 446 is provided at its upper end with an annular groove 450 in which are engaged the pins 452 carried by one arm 454 of a bell crank secured to a shaft 456 which extends across the machine and carries an arm 458 connected by a link 460 to a crank pin 462 carried by the cam 102. Accordingly, rotation of the shaft 55 will impart an oscillating movement to the shaft 456 to raise and lower the sleeve 446 during each cycle of operation.

The other arm 464 of the bell crank last mentioned is connected by a rod 466 to the operating arm 468 of a counter 470 which records the total issue of tickets by the machine. Distributed through a 180° arc are a series of slides 472 and one slide 474 mounted in axially extending slots in a fixed support 476, being held in the slots by a surrounding band 478. The slides 472 and 474 are provided with notches 480 into which extends the peripheral edge of the plate 442 and extensions 486 of the arms 448 which, when the sleeve 446 is in its lower position, are aligned with the edge of the plate 442, being received in slots 484 therein. Under these conditions the extensions 486 and the plate form substantially a complete circular disc entering the notches 480 in the slides and corresponding notches in the walls of the support 476 between the slides.

The slides 472 corresponding to the stations which are represented on the drum 22 are connected by rods 490 to the actuating arms of counters 492 which individually record the tickets issued to several stations and are visible through a glass cover in the machine. The single slide 474 corresponds to the issue of tickets to the miscellaneous stations represented by the slugs and this slide is connected through a rod 494, a bell crank 496 and a rod 498 with the actuating arm 500 of a counter 502 which records the total number of tickets issued to these miscellaneous stations.

In order to protect the individual ticket agents who may use the machine and to insure that a ticket issued by any agent will bear an indication to identify him, each agent is provided with an individual key such as indicated at 256 in Figures 13, 15 and 16. This key which takes the form of a flat strip of metal is insertable in the slot 258 (Figure 5) and is guided for movement into the machine to a position limited by engagement of its head with the left-hand plate 261 of the operating unit. Each of the keys is provided with a rectangular notch 260 in its lower edge and carries at its forward portion type 257 coded to indicate the individual agent. When the key is in its operative position this type is aligned with the effective type on the dating head. Interlocks with the key are provided to insure that the machine cannot be operated unless the key is inserted. For this purpose a bracket arm 315 is secured to the link 318 and has pivoted to it at 317 an arm 319 provided with a nose 321 and arranged to be cammed upwardly by a cam surface 323 provided on the frame. An arm 335 pivoted at 327 to the frame has a tail portion 331 which, when the key is absent, is disposed in the path of a pin 333 as indicated in Figure 15 so as to prevent the right-hand movement of the link 318. A spring 329 urges this lever 335 to the position indicated in Figure 15.

When the key is inserted it will engage the upwardly extending portion of the arm 335 to rock this arm to the position indicated in Figure 16 to clear the pin 333. However, even then the machine cannot be operated unless the notch 260 is located in position to be entered by the nose 321 of the lever 319 as it is cammed upwardly by the cam 323, the proper position of the notch corresponding to a complete insertion of the key, though, as pointed out hereafter, the final proper position of the key is insured by the action of lever 319 upon initiation of operation of the machine. In the proper unlocked condition of the machine the conditions illustrated in full lines in Figure 13 will exist. If after insertion of the key the lever 46 is rocked downwardly then the conditions illustrated in Figure 16 will exist. Under these circumstances if the electrical circuit is opened, for example, by manipulation of the switch 193 or by power failure the operator may withdraw his key in which case the right-hand end of the notch 260 acting on the member 319 will serve to move the link 318 to the left and restore the lever 46 to its upper position. As pointed out hereafter the key cannot be withdrawn if simultaneously with depression of the lever 46 the clutch is engaged and the motor energized, withdrawal being prevented until there is printed a ticket which will then normally be issued.

Figure 4:
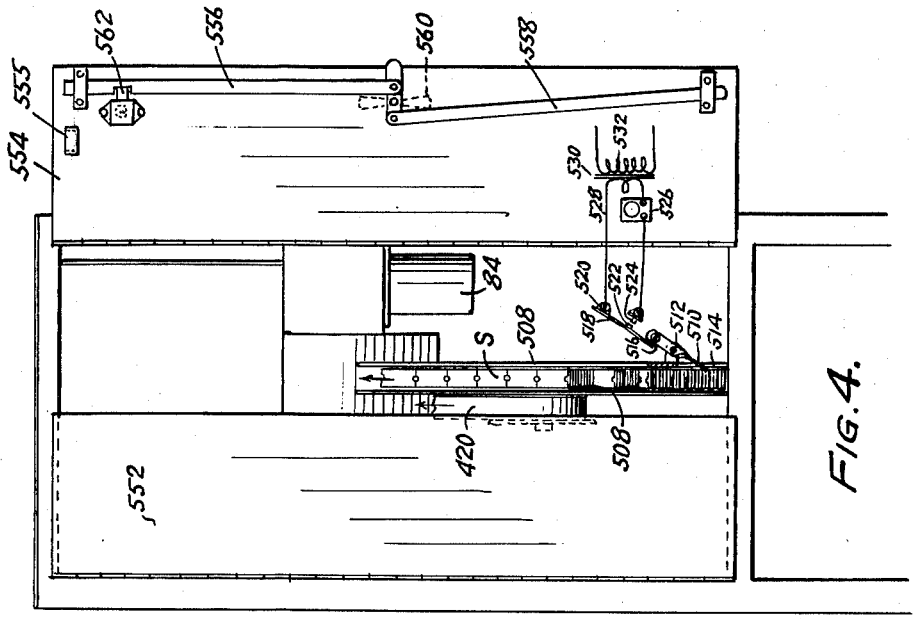
Figure 4 is a rear elevation of the machine showing the locking arrangement for the doors which afford access to its interior and also illustrating, partly in the form of a wiring diagram, a device for signalling approaching exhaustion of the ticket strip supply.

Once the machine is set in operation, unless repairs are required, the ticket strip supply should never become exhausted. This supply is designed in the present machine to take the form of a conventional accordian folded supply received in a receptacle provided between a pair of plates 508 (Figure 4). As the supply nears exhaustion there will normally be added to it a subsequent supply which will be placed in the machine underneath the former strip and secured thereto by an adhesive tape or strip. In order to give warning of the impending exhaustion of the ticket strip supply a finger 510 pivoted at 512 projects into the ticket supply chamber through a slot 514 into engagement with the supply. The upper end of the finger 510 above the pivot 512 carries a pin 516 of insulating rod against which there bears a spring 518 secured to the frame at 520 and provided with a contact point 522 arranged to cooperate with a contact point 524. In series in the electrical circuit with contact points 522 and 524 are a bell 526 and the secondary 528 of a bell transformer 530 the primary 532 of which is connected in parallel with the motor 84. So long as the supply contains some predetermined number of tickets, such as fifty to seventy-five, the finger 510 is held to the right as indicated in Figure 4 so that the contacts 522 and 524 are open. When, however, the supply is exhausted below this minimum the spring arm 518 may rock the finger 510 toward the left producing a closure of the contacts 522 and 524. Thereafter, whenever the machine is operated the bell 526 will simultaneously ring giving warning to the operator that the ticket supply must be replenished.

In order, however, to insure that the machine will not be operated despite the warning until exhaustion of the strip supply, or if the signal for some reason fails to operate, there is provided an additional means for locking the machine when exhaustion of the supply is imminent. To secure this result there is pivoted at 534 a bell crank 536 (Fig. 8) having a light forwardly extending arm 538 projecting beneath a notch 540 in the link 318. The other arm 542 of this bell crank is provided with a pin 544 which rests under the action of gravity against the ticket strip S passing upwardly from the supply over fixed pins 547 and 549. So long as ticket strip exists between the pins 547 and 549 the arm 538 of the bell crank is held down so as not to interfere with the movement of the link 318. If, however, the trailing end of the strip clears the pin 544 the bell crank will rock under the action of gravity so that as soon as the link 318 moves to its normal inactive position the arm 538 of the bell crank will enter the notch 540, preventing any subsequent movement of the link and thus locking the machine. Even under such conditions, however, there will be available an end of the ticket strip to which a new supply may be secured. The ticket strip passes from the device just mentioned about a guide 550 for entrance into the ticket feeding and printing unit shown in Figure 9.

In order to lock up the machine against unauthorized tampering, a pivoted plate 546, hinged at 548 covers the main top plate 5, being provided with an opening exposing the operating lever 10 and its associated parts and the station markings and provided with openings aligned with the openings 297 and 308. In this plate is the locked door 507. The back of the machine is provided with doors 552 and 554 arranged to be latched by rods 556 and 558 connected to a handle 560 and which may be locked by a lock 562. When the door 554 is closed a lug 555 thereon may engage a hook 550 carried by the plate 546. Thus the entire machine may be locked up so that its various parts may be opened only by the possessor of a proper key or keys.

The ticket issued by the machine is indicated in Figure 2 at T. The origin station printed by the type at 190 is indicated at A. The serial number printed by the numbering head 192 is indicated at B. The destination and price are indicated at C and D respectively and are arranged to be printed either by a type plate 24 on the drum 22 or by the type 293 and 295 on a removable slug. The date printed by the dating head 194 is indicated at E. The code designation of the operator printed by the type on the operator's key is indicated at F. As indicated previously, the tickets may be printed with other matter, such as indicated at G, comprising, for example, an indication of the railroad and the conditions of sale or validity of the ticket. This matter may be preprinted on the ticket or may be printed in the machine by type at 190. Of course, in the event that different classes of tickets, such as coach and Pullman tickets, are both to be issued by the same machine, then the designation for the type of a destination for which the ticket is good will be printed at the time of issue by type on the drum or slug. It will, of course, be evident that the machine permits a very wide variation of the matters to be printed depending entirely on the uses to which it is to be put, the changes for these purposes involving merely a change of type faces.

Assuming that the machine has been threaded with a ticket strip and has been previously operated, the conditions and sequence of events in operation will be as follows:

When the parts of the machine are in rest position there will be located immediately opposite the printing surface 24 (or the corresponding surface of a slug), and the dating head, an area of the ticket strip on which was previously printed the origin station by the type 190 and the serial number by the numbering head 192. This area would have been printed, for example, at the time of issue of the seventh preceding ticket.

Assuming a cycle of operation involving the selection of the destination by the drum 22, the sequence of operation will be as follows.

The operator must locate in the machine his individual key 256. As this is moved into its operative position its leading end engages the lever 335 and rocks the same against the action of spring 329 to cause its end 331 to move out of the way of the pin 333 on the link 318 as shown in full lines in Figure 13. Prior to such insertion of the key the location of lever 335 in the path of this pin will lock up the machine by preventing depression of the lever 46, the locking action being effective in the same fashion as that involving locking by the lever 108, which, of course, must now be in unlocking position.

In order to select the proper destination the operator grasps the knob 12 and rotates the indicator 18 to the proper station marking. This accomplishes the positioning of the elements of the machine in various ways. First, it brings the drum 22 to a position in which the desired destination type is opposite the ticket area to be printed. In this action the notch 30 is carried out of alignment with the roller 372 so that the gate 368 is moved over the opening 398 in such position as to prevent the entrance of a slug. At the same time, through the gearing 436 and 438 one of the fingers 686 is positioned in alignment with the slide 472 corresponding to the selected destination. At the same time the disc 442 is positioned to lock all of the other sliders. As a consequence, of the total number of individual counters the only one which can be operated is that one corresponding to the selected destination.

The operation is initiated by a depression of the knob 12 which depression insures the proper positioning of the shaft 2 (if previously slightly misaligned) by entrance of the tail 14 of the lever 10 in a proper notch of the member 13. The depression of the lever 10 through its connection to the lever 46 pulls the latter downwardly effecting several results. When the lever 46 rocks downwardly the link 319 is moved to the right as indicated in Figures 13 and 16. The result of this is that the lever 319 is cammed upwardly by the cam surface 323 so that its nose 321 enters the notch 260 in the key. In entering this notch it will insure that the key is pressed inwardly sufficiently so that the type 257 indicating in code the operator of the machine will print upon the ticket to be issued. The presence of the notch 260 in at least approximately correct position is necessary in order that the lever 319 may rise over the cam 323. Accordingly, the mere insertion of a blank strip of metal cannot release the machine in the same fashion as the operator's key. In the action just described the operator's key is not yet locked in the machine and, in fact, it is desirable that it should not be locked. For example, in the case of a failure of power the operator might have depressed the lever 46 with the result that upon restoration of power the machine would go through its cycle. Such operation should be prevented if the operator removes his key. He can remove the key; but in doing so it will push the lever 319 and through it the link 318 restoring the lever 46 to its original position. Thus if the operator removes his key the machine will not become operable except by a separate depression of the lever 10 following reinsertion of an operator's key.

Figure 8:
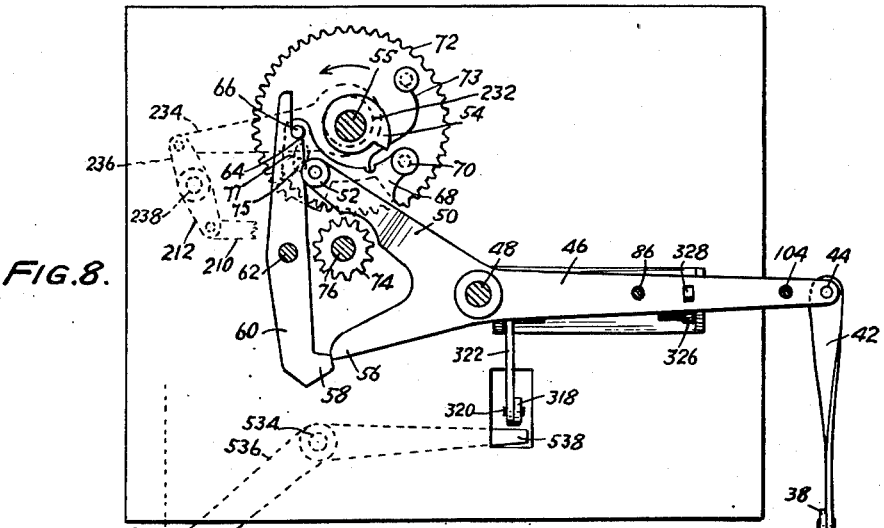
Figure 8 is a vertical section taken on the plane indicated at 8—8 in Figure 7.
Figure 23:
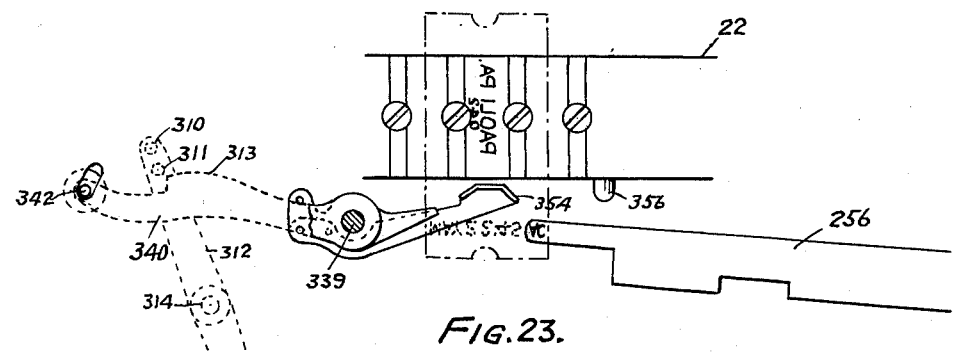
Figure 23 is a fragmentary view illustrating the arrangement of elements involved in printing accomplished by selection in the machine.
Figure 24:
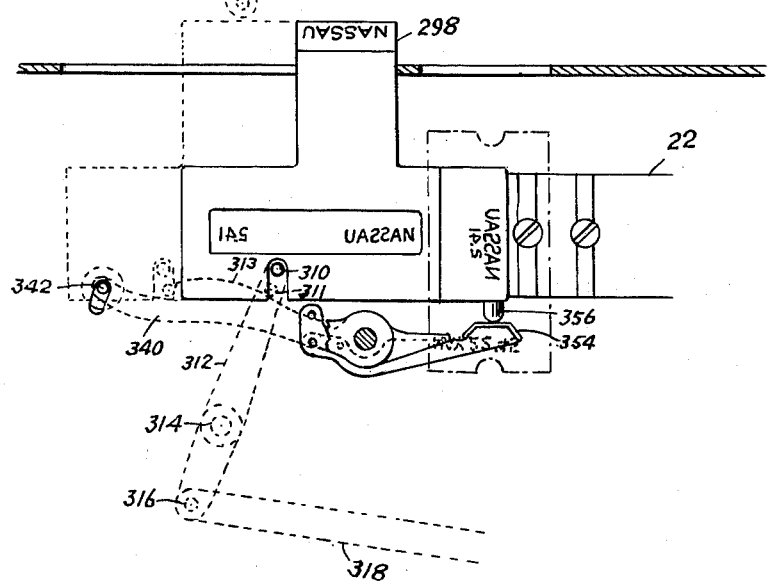
Figure 24 is a similar view but illustrating the printing of a ticket by the use of one of the removable slugs.
Figure 28:
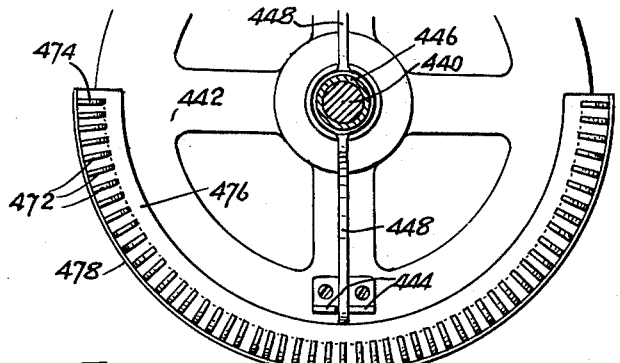
Figure 28 is a section taken on the plane indicated at 28—28 in Figure 27.
Figure 27:
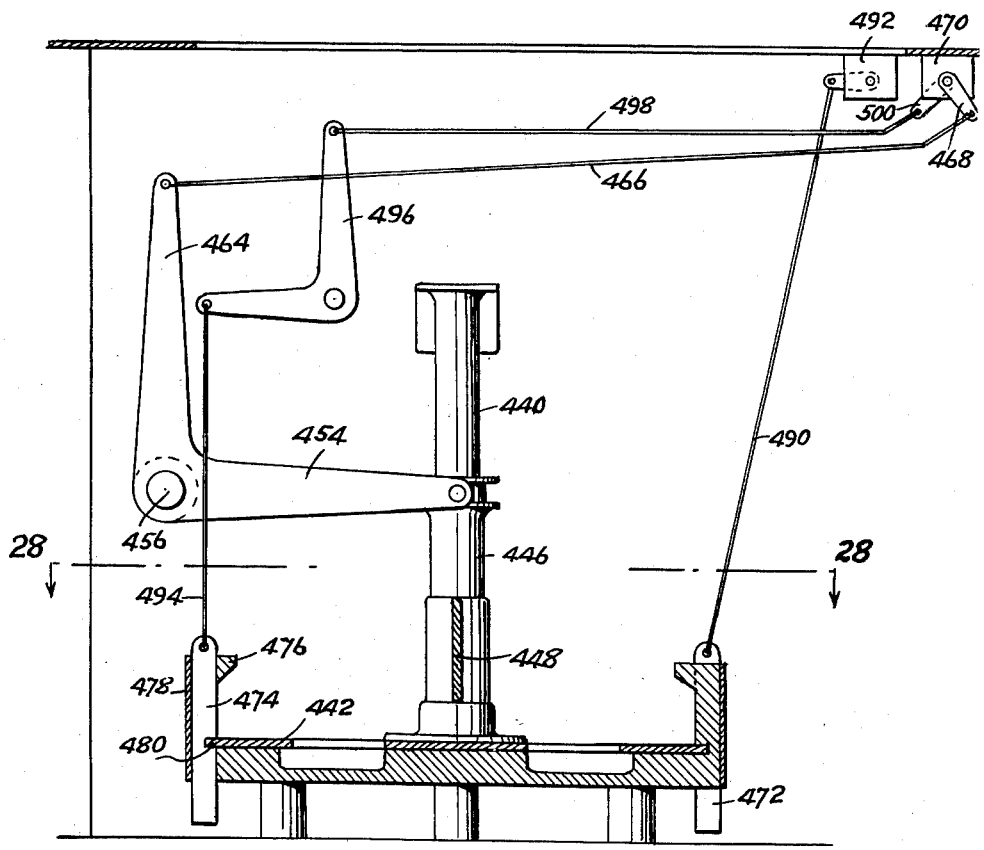
Figure 27 is a sectional view illustrating in particular the arrangement for actuating the counters, the plane of this section being at right angles to the section shown in Figure 6.

The depression of the lever 46 will cause its arm 56 to clear the lower hooked end 58 of the lever 60 so that this lever 60 may rock counterclockwise as indicated in Figure 8 to permit the gear segment 68 to drop into mesh with the pinion 74. At the same time the pin 86 will engage the switch plate 88 and close the circuit of the driving motor 84. The movement of the link 319 to the right from the position indicated in Figure 13 will cause a rocking of the lever 312 in a counterclockwise direction until the pin 316 passes to the opposite side of dead center with the result that the lever 46 is latched yieldingly downwardly. In the absence of a slug the movement of the lever 312 is essentially an idle one and the lever 304 is not carried therewith. The free movement of the lever 312 as described is permitted by virtue of the fact that the pin 356 is out of position to engage the cam portion 354 of the lever 352 and consequently the weighted end 344 of lever 340 holds the shoulder 363 out of the path of the pin 311.

The cycle of revolution of the shaft 55 now begins. The pin 66 passes down the right-hand side of the lever 60 in the initial phase of rotation and this prevents the lever 46 from rising, since hook 58 now underlies the end of arm 56, until such time as the printing of the destination takes place. The prevention of rise of the lever 46 prevents the removal of the individual operator's key and also prevents the lifting of the main operating and selecting lever 10, which, being prevented from rotation by the toothed member 13, results in a locking up of the machine against any attempt to change the destination which is printed once the machine has been set into operation.

As a matter of fact, the action of the cam 164 on the roller 168 to print the destination, the date, and the operator's identification takes place almost immediately after the beginning of the cycle of rotation of the shaft 55. Thus the ticket to be issued is completely printed so soon after the beginning of operation that even if the interlocks were not present it would be substantially impossible to make one selection and secure the issue of a ticket having a different destination printed thereon.

Another event occurring almost immediately in the beginning of the cycle is the registering of the issue of a ticket. The crank 462 through the link 460 rocks the shaft 456 and lifts the sleeve 446 to raise the selected slider 472 which will actuate the corresponding counter. At the same time the arm 464 attached to the shaft 456 will operate the total counter. It may be noted that during the operation of the selected slider rotation of the shafts 440 and 2 will be prevented by reason of the interlock of one of the fingers 486 in the axial slot of the selected slider.

The cam 102 on the shaft 55 rocks the bell crank 98 causing its end 96 to move downwardly to insure that the switch plate 88 will be held in switch closing position. This condition is maintained until the end of the cycle so that despite the earlier lifting of the lever 46 the motor circuit will remain closed to complete the cycle.

The eccentric 232 acting upon the lever 236 and shaft 238 produces an advance of the numbering head 192. At the same time the ribbon feed is actuated through the link 210 by the rocking of the lever 208.

The next event in the cycle of operation is the printing of a ticket area subsequent to the area to be issued with the origin and a serial number by means of the plate 190 and the numbering head 192. As indicated previously the plate 190 may carry not only the origin but such other matter as conditions of sale or the like, this plate being, in any event, substantially permanent for a particular origin station. The printing action is, of course, effected by contact of cam 164 with roller 166.

Following this event the driving pin 120 of the Geneva mechanism enters the driven element of this mechanism to produce a feed of the ticket strip equal in amount to the length of one ticket area. This area is projected beyond the stationary knife 286 and immediately upon completion of the feeding movement the ticket is cut off by the action of the movable knife 284 effected by the cam 274. As the knife 284 moves forwardly and cuts the strip the finger 288 is pushed forwardly by the spring 292 in such fashion that by engagement with the lower portion of the issued ticket it will force the ticket forwardly of the hooks 294 by which the ticket will be retained with its severed lower edge above the stationary knife 286, so as to be in a forward position clear of the open space through which a subsequent ticket will be issued. As will be evident this arrangement will permit the accumulation of a series of tickets in position in front of the hooks 294 and above the fixed blade 286. This is convenient in the event that in a single transaction a number of tickets are to be issued to a single party. The total number of tickets may be issued and permitted to remain in position until grasped by the operator and removed as a group. The spring 292 is yieldable and will cause the finger 288 to exert a yielding pressure on the stack of tickets at each forward movement of the knife.

The return of the movable knife to open position is normally accomplished by the action of the spring 282, but if, for some reason, friction prevents the spring from acting it will in any event be returned in a subsequent cycle of operation by the action of cam 274 on pin 276, this action occurring prior to the ticket feed so as to clear the path of the ticket advance.

Prior to the end of a cycle of operation the cam 54 engages the roller 52 to rock the lever 46 upwardly. This effects several actions. First, the lever 60 is rocked clockwise as viewed in Figure 8 by the action of the lever end 56 on hook 58, this action occurring in a direction such as to exert a torque on the lever 60. It is thus positioned so that the shoulder 64 is in the path of the pin 66 carried by the segment 68. Accordingly, as this segment ultimately comes around it will be retarded from movement with the gear 72 so that it will be drawn out of mesh with the driving pinion 74. The rise of the lever 46 will, of course, remove the pin 86 from engagement with the switch plate 88. Nevertheless, the switch will remain closed until the very end of the cycle when the lever 98 drops off the cam 102. After the segment is disengaged the pinion 74 may continue to spin so that the stopping of the mechanism is not accompanied by such shock as would occur if the motor had to be suddenly arrested. The parts suddenly stopped are quite light so that quiet operation occurs.

The upward movement of the lever 46 forcibly lifts the knob 12 on the lever 10 restoring it to upper position. The operator, if he keeps his hand on this knob, is thus warned of the completion of the cycle and if the knob is released when pressed upwardly the cycle will come to an end and the machine will stop. If two or more tickets are to be issued, however, the operator need only keep the weight of his hand on the knob. The upward movements which he will feel will enable him to count the tickets as they are being issued, the result being the rapid sequential issue of the tickets of a group.

The rise of the lever 46 also produces a movement of the link 318 to the left restoring the lever 312 to its initial position and removing the lever 319 from the notch 260 in the operator's key. Accordingly, at the end of the cycle of operation all of the parts are restored to initial position, though as just indicated the continued pressure of the operator on the lever 10 may serve to issue one or more additional tickets substantially as a continuous operation of the machine.

The foregoing operation was that characteristic of selection of a destination to be printed by the drum 22. This operation prevented the entrance of a slug by movement of the gate 368 over the slot 308 and in turn would be prevented by the presence of a slug since in such case the tail portion 298 of the slug would project across the path of the gate 368 and would prevent rotation of the drum 22 by preventing movement of the roller 372 from the notch 30 in the ring 28. If a slug is to be used for printing, the drum 22 must be brought to the position in which the blank backing plate 26 is brought opposite the ticket strip. When this is done the notch 30 is in position for the roller 372 to drop therein and clear the gate 368 from the slot 308, and the pin 356 is located in contact with the cam end 354 of the lever 352 so as to rock this downwardly and, through the spring 362, move the shoulder 363 upwardly into the normal path of movement of the pin 311. Assuming that the drum has been moved to the position just indicated, the machine is locked up despite the presence of the individual operator's key in position as described above inasmuch as the lever 46 cannot be depressed since the pin 311 would be stopped by the shoulder 363. The presence of a slug is necessary to effect release of the machine. When the slug is dropped in position its notch 300 embraces the pin 310 and the turned end 386 of the lever 384. Its lower edge engages the pin 342 moving it downwardly and so carrying the shoulder 363 below the path of pin 311. With the slug in position, therefore, the lever 46 may be depressed to start the cycle, the pin 311 moving over the cam surface 313 of the lever 340 so as to hold it depressed despite the fact that the right-hand end of the slug as viewed in Figure 13 will move sufficiently to the left to clear the pin 342.

As the link 318 moves to the right from the position shown in Figure 13 the pin 316 engages the end 382 of the plate 374 causing the lip 380 to move over the upper edge of the slug preventing its removal. The pin 310 in the movement of the lever 312 counterclockwise slides the slug toward the left as viewed in Figure 13 to bring its ticket printing type into alignment with the leading ticket area and as the slug so moves the wall of the notch 300 engages the turned end 386 of the lever 384 to carry this lever along with it and thereby actuate the feeding pawl 399 serving to give a single step advance to the record paper strip 420 through the rotation of the roller 414. It may be here noted that in the case of selection of destination on the drum no such feeding movement was imparted to the record strip, the lever 384 not following the lever 312 in the movement of the latter. The record strip is thus advanced only when printing is accomplished by one of the slugs.

The lateral movement of the slug brings the type 293 and 295 into position for printing on the ticket, the location of this type being the same as that of a type element on the drum 22 when in printing position. The end of the slug is then brought to a position in which it is backed up by the blank plate 26 to provide rigidity for proper printing. At the same time the types 297 and 301 are brough into position to print on the record strip. Except for the matters indicated the cycle of operation in using the slug is essentially identical with that involved in the accomplishment of printing by type on the drum. The two printing operations are similarly carried out followed by feeding, severing and termination of the cycle. In this case the positioning of the drum will have aligned one of the fingers 486 with the slider 474 corresponding to the counter for miscellaneous tickets. Consequently, this counter will be advanced as well as the total counter.

In this cycle of the machine, however, the movements of the lever 312 are not idle ones. Following the printing and at the time when the lever 312 is returned to initial position the slug is moved thereby to a position for removal and is released by the lip 380 when the pin 316 clears the end 382 of the lever 374. In the return movement of the lever 312 the lever 384 is also returned by engagement of its lip 388 thus imparting a return movement to the pawl 399.

While issue of a ticket when a slug is inserted may be effected as described by depression of knob 12, it may be noted that operation may also be initiated by manually moving the slug to the left. In this way the slug may be inserted and operation initiated by one continuous movement of the slug.

It will be evident from the above that there is insured a proper recording of every ticket issued by the machine with printing on the ticket of the material matters of date, destination and code indication of the operator. The machine cannot be operated unless the operator's key is in position. Furthermore, it is impossible to use a slug with the drum in any but the miscellaneous positions or to operate the machine when the drum is in miscellaneous position unless a slug is inserted in the machine. There is thus insured not only proper issue but proper recording of all the issues.

The method of accounting will be obvious from the above. So far as tickets issued to the destinations on the drum are concerned all of the issues are recorded on the individual destination counters. What is registered on these may be taken off photographically or in other fashions such as by replacing the counters with numbering heads and causing printing upon paper sheets with interposition of carbon paper. In the case of the stations to which the slugs correspond the tickets issued thereto are recorded along with their price on the paper strip, portions of which may be removed from time to time from the machine by lifting the cover plate 506 and tearing the strip along the tearing edge 418. As a further check on the completion of the recording the records of the miscellaneous numbering head should agree with the number of miscellaneous tickets recorded on the paper strip. The totals of all issues should correspond to the total issue counter.

In order to protect the operator of the machine, if several operators use one machine as will normally be the case, a special slug may be provided which will print instead of the destination some special matter, such as the word "TEST," indicating that the ticket issued is merely a check ticket. Such a ticket will indicate the operator's code, the date and a serial number which will serve to mark the beginning or end of his period of duty. Regulations may be provided to require his turning this ticket in to become part of the accounting records. Similarly, provision may be made for issuing other dummy tickets particularly in starting up the machine when it will be evident that, say, the first six tickets issued might be unprinted by the origin and serial number printing mechanism. Once the machine is put into operation it will normally never run out of tickets in view of the use of the ticket exhaustion indicating means described above. By the use of folded tickets the end of one ticket supply may be secured to the beginning of a subsequent supply by the use of an adhesive tape or strip so that no interruption of operation need occur.

While in its preferred and most generally useful form the ticket machine involves the possible printing of tickets by both selection built into the machine (by the use of the drum) and by the use of removable slugs, it will be evident that the machine may have either of these alternative possibilities alone with attentant simplification. It will be understood, also, that the invention is not limited to the specific mechanisms herein disclosed which are merely illustrate of a preferred embodiment, and accordingly the scope of the invention is to be considered only as limited by the following claims.

What I claim and desire to protect by Letters Patent is:

1. In combination, means for guiding and feeding a ticket strip having successive ticket areas thereon, selectively operable means for printing a selected one of different matters on the leading ticket area of the strip in a ticket issuing operation, removable means for printing one of a group of other matters on the leading ticket area of the strip, and interlocking means preventing printing of any of the first group of matters when one of said removable means is in position for printing.

2. In combination, means for guiding and feeding a ticket strip having successive ticket areas thereon, selectively operable means for printing a selected one of different matters on the leading ticket area of the strip in a ticket issuing operation, removable means for printing one of a group of other matters on the leading ticket area of the strip, and interlocking means for preventing printing by any of said removable means when one of said first group of matters is selected for printing.

3. In combination, means for guiding and feeding a ticket strip having successive ticket areas thereon, selectively operable means for printing a selected one of different matters on the leading ticket area of the strip in a ticket issuing operation, removable means for printing one of a group of other matters on the leading ticket area of the strip, means for recording on a record strip the printing of the leading ticket area by one of said removable means, and means for preventing printing on the ticket strip by one of said removable means upon exhaustion of the record strip without interfering with further printing by said selectively operable means.

4. In a ticket issuing machine, means for guiding and feeding a ticket strip having successive ticket areas thereon, selectively operable means permanently in the machine for printing a selected one of different matters on the leading ticket area of the strip in a ticket issuing operation, removable means for printing one of a group of other matters on the leading ticket area of the strip, interlocking means preventing simultaneous printing of the leading ticket area by both of said printing means, means for recording on a record strip the printing of the leading ticket area by one of said removable means, and means for advancing the record strip between recordings of the printing of tickets by said removable means but not upon the printing of tickets by the first mentioned printing means.

5. In combination, means for guiding and feeding a ticket strip having successive ticket areas thereon, removable type-carrying means for printing on ticket areas of the strip, a guide for said removable means, printing means cooperating with said removable type-carrying means and defining a printing station, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, and means for severing the ticket strip transversely to separate ticket portions therefrom, said severing means being located adjacent to said printing means and beyond the same in the direction of feed of the ticket strip.

6. In combination, means for guiding and feeding a ticket strip having successive ticket areas thereon, removable type-carrying means for printing on ticket areas of the strip, a guide for said removable means, printing means cooperating with said removable type-carrying means and defining a printing station, additional type-carrying means having a fixed location at said printing station and cooperating with said printing means for printing other matter on ticket areas of said strip, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, and means for severing the ticket strip transversely to separate ticket portions therefrom, said severing means being located adjacent to said printing means and beyond the same in the direction of feed of the ticket strip.

7. In combination, means for guiding and feeding a ticket strip having successive ticket areas thereon, removable type-carrying means for printing on ticket areas of the strip, a guide for said removable means, printing means cooperating with said removable type-carrying means and defining a printing station, additional type-carrying means having a fixed location at said printing station, in advance of the printing position of said removable means at said station from the standpoint of direction of feed of the ticket strip, and cooperating with said printing means for printing other matter on ticket areas of said strip, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, and means for severing the ticket strip transversely to separate ticket portions therefrom, said severing means being located adjacent to said printing means and beyond the same in the direction of feed of the ticket strip.

8. In combination, means for guiding and feeding a ticket strip having successive ticket areas thereon, removable type-carrying means for printing on one ticket area of the strip in a ticket issuing operation, a guide for said removable means, printing means cooperating with said removable type-carrying means and defining a printing station, additional type-carrying means cooperating with said printing means for printing other matter on a subsequent ticket area during the same ticket issuing operation, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, and means for severing the ticket strip transversely between the first-mentioned ticket area and said subsequent ticket area during the same ticket issuing operation and subsequent to the printing operation by both said type-carrying means, said severing means being located adjacent to said printing means and beyond the same in the direction of feed of the ticket strip.

9. In combination, means for guiding and feeding a ticket strip having successive ticket areas thereon, removable type-carrying means for printing on one ticket area of the strip in a ticket issuing operation, a guide for said removable means, printing means cooperating with said removable type-carrying means and defining a printing station, additional type-carrying means cooperating with said printing means for printing other matter on a subsequent ticket area during the same ticket issuing operation, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, and means for severing the ticket strip transversely between the first-mentioned ticket area and said subsequent ticket area during the same ticket issuing operation and subsequent to the printing operation by both said type-carrying means and an advancing movement of said ticket strip, said severing means being located adjacent to said printing means and beyond the same in the direction of feed of the ticket strip.

10. In combination, means for guiding and feeding a ticket strip having successive ticket areas thereon, removable type-carrying means for printing on ticket areas of the strip, a guide for said removable means, printing means cooperating with said removable type-carrying means and defining a printing station, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, means for severing the ticket strip transversely to separate ticket portions therefrom, said severing means being located adjacent to said printing means and beyond the same in the direction of feed of the ticket strip, and means for preventing removal of said removable type-carrying means following initiation of operation of the controlling means until completion of a cycle of operation of the machine.

11. In combination, means for guiding and feeding a ticket strip having successive ticket areas thereon, removable type-carrying means for printing on ticket areas of the strip, a guide for said removable means, printing means cooperating with said removable type-carrying means and defining a printing station, means controlling operation of the machine to effect printing by said printing means and feed of the ticket strip, means actuated by movement of said removable type-carrying means along said guide in a direction across the face of the ticket strip and transverse to the direction of feed of the ticket strip past said printing station to initiate operation of the controlling means, said guiding means guiding said strip for movement substantially in a plane at said printing station, means for severing the ticket strip transversely to separate ticket portions therefrom, said severing means being located adjacent to said printing means and beyond the same in the direction of feed of the ticket strip, and means for effecting printing alignment of said removable type-carrying means with said printing means at the printing station.

12. In combination, means for guiding and feeding a ticket strip having successive ticket areas thereon, printing means, removable type-carrying means adapted to be inserted in the machine and cooperating with said printing means for printing matter on the leading ticket area of the strip, means for guiding and feeding a record strip, additional means for recording on the record strip the printing of the leading ticket area by one of said removable means, and means for preventing printing on the ticket strip by one of said removable means upon exhaustion of the record strip.

13. In a ticket issuing machine, means for guiding and feeding a ticket strip having successive ticket areas thereon, printing means, removable type-carrying means adapted to be inserted in the machine and cooperating with said printing means for printing matter on the leading area of the strip, means permanently in the machine for recording the printing of the leading area by a removable type-carrying means, and means for preventing removal of the removable means after initiation of the printing operation and until recording is effected.

REUBEN H. HELSEL.

REFERENCES CITED

The following references are of record in the file of this patent:

UNITED STATES PATENTS

| Number | Name | Date |
|---|---|---|
| 617,313 | Bossuet | Jan. 10, 1899 |
| 878,117 | Burke | Feb. 4, 1908 |
| 1,056,765 | Ohmer | Mar. 18, 1913 |
| 1,091,498 | Friedlein | Mar. 31, 1914 |
| 1,182,053 | Sullivan | May 9, 1916 |
| 1,254,825 | Martin | Jan. 29, 1918 |
| 1,304,977 | Helsel | May 27, 1919 |
| 1,309,954 | Martin | July 15, 1919 |
| 1,333,009 | Borden | Mar. 9, 1920 |
| 1,385,788 | Kirshner | July 26, 1921 |
| 1,392,929 | Fuller | Oct. 11, 1921 |
| 1,539,382 | Thompson | May 26, 1925 |
| 1,593,599 | Robertson | July 27, 1926 |
| 1,607,435 | Carroll | Nov. 16, 1926 |
| 1,858,813 | Wheelbarger | May 17, 1932 |
| 1,866,997 | Bryce | July 12, 1932 |
| 1,984,706 | Slettevold | Dec. 18, 1934 |
| 1,956,569 | Foothorap | May 1, 1934 |
| 1,992,767 | Pierson | Feb. 26, 1935 |
| 2,202,377 | Helsel | May 28, 1940 |
| 2,361,392 | Freedman | Oct. 31, 1944 |